UNITED STATES PATENT OFFICE.

HENRY S. ESCH, OF NEW YORK, N. Y.

ANTISLIP ARMOR FOR CUSHION TIRES.

1,407,522.  Specification of Letters Patent.  Patented Feb. 21, 1922.

Application filed November 29, 1920. Serial No. 426,989.

*To all whom it may concern:*

Be it known that I, HENRY S. ESCH, a citizen of the United States, residing in New York, in the county of New York and State of New York, have invented certain new and useful Improvements in Antislip Armors for Cushion Tires, of which the following is a specification.

The specific object of this invention is to provide a plurality of closely connected armor elements arranged circumjacent to the tire, these elements acting as an armor, preventing abrasion and reducing wear of the tire and, at the same time, materially increasing the tractive effect of the wheel while preventing side slipping or skidding upon icy, oily or slippery surfaces.

A further object is to provide such armor devices with means whereby their calk-like tread elements can be replaced when worn, while the underlying armor plates are substantially indestructible.

These and other objects, such as initial low cost, adaptability to tires of ordinary construction, ease of application and safety secured by their use, are attained by the peculiar construction and combination of parts hereinafter described and shown in the accompanying drawings, forming an essential part of this disclosure, and in which:—

Figure 1 is a partial side elevational view of a conventional tire showing the application of the armor elements.

Figure 2 is an enlarged transverse sectional view of the tire taken through the center of one of the armor elements on line 2—2 of Fig. 1.

Figure 3 is a fragmentary sectional view, taken on line 3—3 of Fig. 4, showing the method of riveting the parts.

Figure 4 is a plan view looking at the face side and showing a pair of armor elements, parts being broken away to show the construction.

Figure 5 is a partial plan view of one of the engaging bands.

Referring to the drawings in detail, the numeral 10 designates the felly of a vehicle wheel, supported by spokes (not shown) circumjacent to which is a metal rim or band 11 acting as a seat for the solid cushion tire 12, upon which the elasticity of the wheel depends.

The sides of the tire taper outwardly from its periphery 14 to the base or widest portion, adjacent the band 11, and are extended laterally outward into annular beads 15, one of which enters the correspondingly shaped cavity in the tire clamp 16 held by the screws 17 to the felly, while the other bead is similarly held in the opposite clamp 18 secured in place on the felly by removable clips 20 held by the screws 19.

The foregoing description is to be understood as applicable to any ordinary type of cushion tread wheel and not as forming any part of the invention which will now be disclosed.

A plurality of relatively thin metal plates 25, preferably sheet steel, of oblong rectangular shape having rounded corners, are curved upwardly at each end and pierced in such manner as to form a plurality of sharp spurs 26 adapted to become embedded in the face or tread surface 14 of the tires.

Attached to each of these plates, by a central rivet 27, is a metal frame 28 having opposed, plate-like projections 30 suited to engage closely upon opposite sides of the tire 12, as best shown in Fig. 2.

The rivets 27 pass through central bosses 31 on the opposite sides of the frames 28, these sides being relatively smooth and level except along their side edges where raised level seats 32 are formed, having central lateral extensions 33 blending into lugs 34 on opposite sides.

These frames in their plate portions contain through openings 35 and have near their ends raised bosses 36 drilled to receive rivets 37 used to connect the spur or tread plates 38, the same resting on the seats 32 between the extensions 33 and which are provided on their outer surfaces with raised ledges or spurs 39, here shown as extending inward transversely from the corners of the plates 38.

These plates are recessed at the front and back to receive projections 40 formed with the frames 28 at their edges adjacent the bosses 36, the latter elements being in the same plane as the seats 32.

Disposed between the faces of the frames 28 and backs of the spur plates 38 are two or more metal bands 42 and 42', their ends being notched as at 43, to meet and avoid the center projecting boss 31 and rivet 27 at the point of juncture, other openings 44 permitting corresponding bosses and rivets in adjacent armor elements to pass through.

Smaller openings 45 allow the end rivets 37 to pass, as best shown in Fig. 3, these

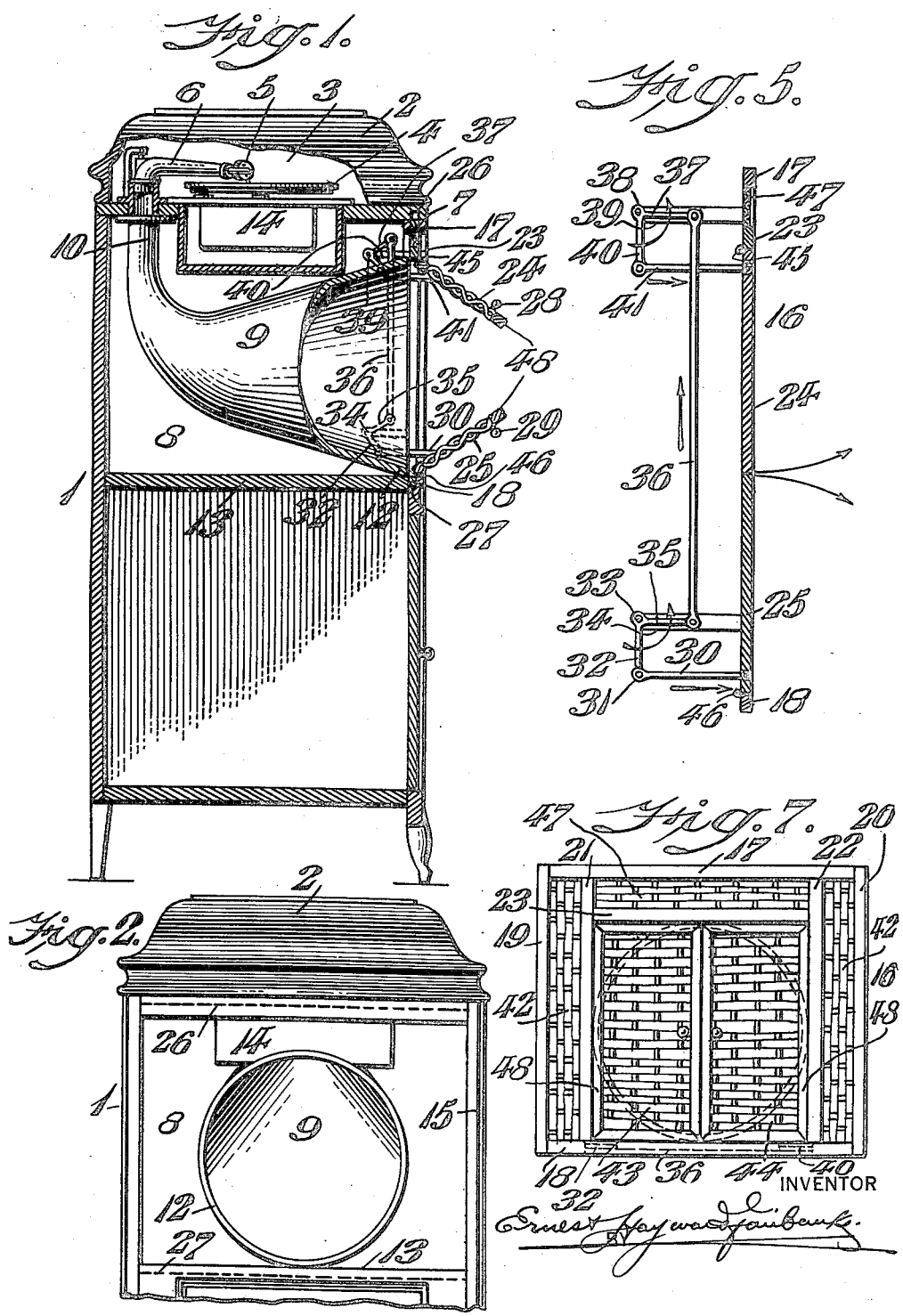

E. H. FAIRBANKS.
TONE MODULATING DEVICE FOR TALKING MACHINES.
APPLICATION FILED JAN. 10, 1920.
1,407,523.
Patented Feb. 21, 1922.
3 SHEETS—SHEET 2.
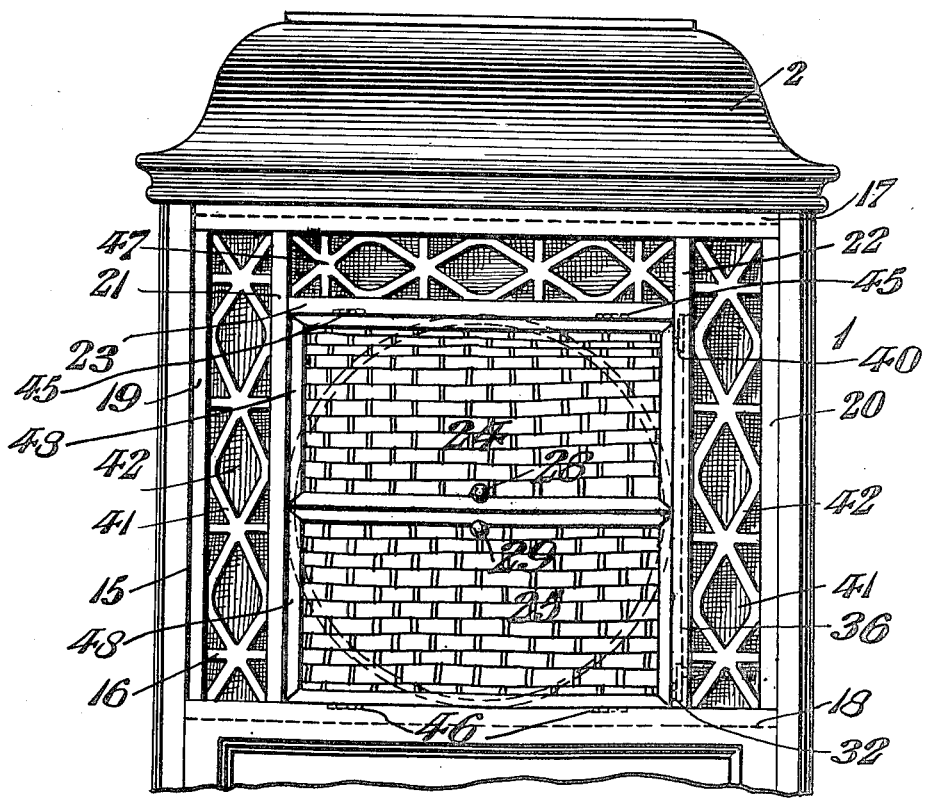
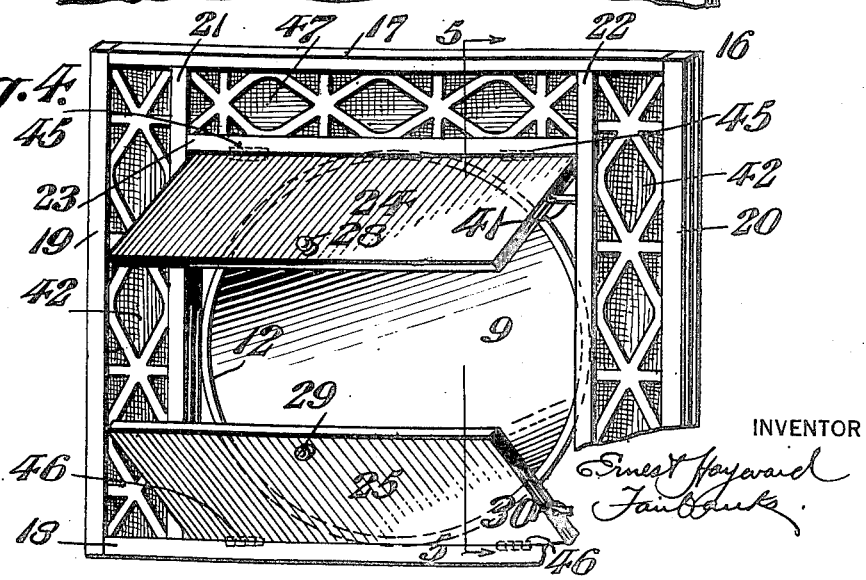
INVENTOR
Ernest Hayward Fairbanks E. H. FAIRBANKS.
TONE MODULATING DEVICE FOR TALKING MACHINES.
APPLICATION FILED JAN. 10, 1920.
1,407,523.      Patented Feb. 21, 1922.
3 SHEETS—SHEET 3.
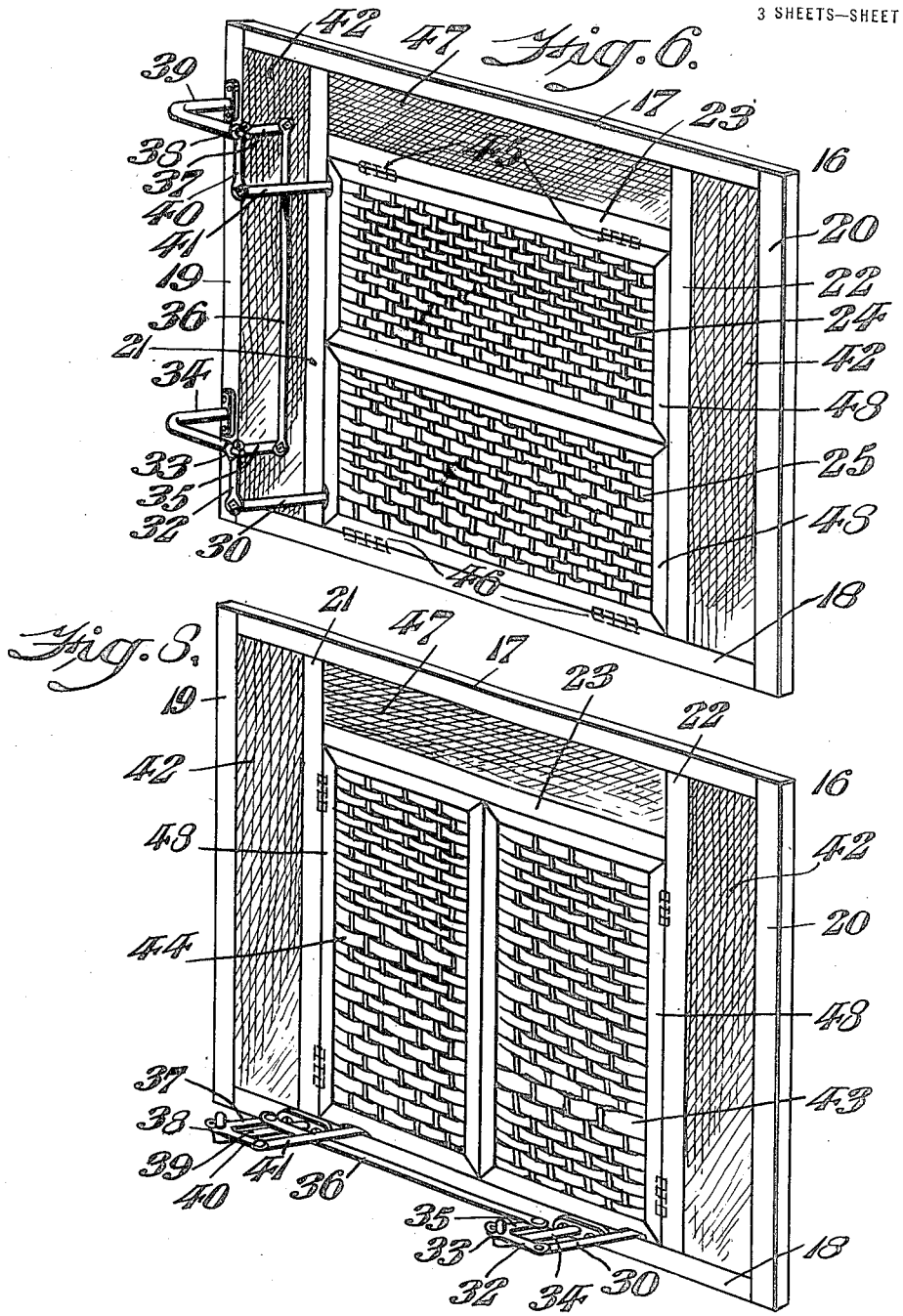
INVENTOR

UNITED STATES PATENT OFFICE.

ERNEST HAYWARD FAIRBANKS, OF MERCHANTVILLE, NEW JERSEY.

TONE-MODULATING DEVICE FOR TALKING MACHINES.

1,407,523.

Specification of Letters Patent. Patented Feb. 21, 1922.

Application filed January 10, 1920. Serial No. 350,580.

*To all whom it may concern:*

Be it known that I, ERNEST HAYWARD FAIRBANKS, a citizen of the United States, residing at Merchantville, in the county of Camden, State of New Jersey, have invented a new and useful Tone-Modulating Device for Talking Machines, of which the following is a specification.

In certain types of talking machines, wherein a concealed horn or amplifier is employed, the sound orifice thereof is provided with or controlled by horizontally swinging, tone modulating, independently operated doors, whose position with relation to the exit end of the amplifier materially affects the volume of sound issuing therefrom, the loudest reproduction being obtained with the doors in extreme open position and the most muffled when the doors are closed, the volume of sound proportionately varying when said tone modulating doors are in positions intermediate of these extremes.

In talking machines of this general character now on the market, the upper portion of the talking machine cabinet has a cavity closed by a pair of these solid wooden tone modulating doors, and is somewhat lacking in ornamental appearance, and it is further necessary to open and close or set said doors independently.

While it has been heretofore proposed to actuate doors of this general character simultaneously by means of a rod extending on an axis transverse to the axis of the doors, no means have been provided for enhancing the ornamental appearance of the cabinet in proximity to said doors or for effecting the simultaneous actuation or setting of both doors by a pull upon one of said doors by simple mechanism such as I employ.

The patent to Johnson, No. 946,442, issued January 11th, 1910, is typical of this general type of machine aforesaid, wherein it has been proposed to employ a concealed horn or sound amplifier having a curved inlet and four rectilinear diverging side walls, the inlet or smaller end of said amplifier being rigidly secured, while its outlet or opposite end is free or unsupported, in conjunction with a pair of rigid, vertical doors mounted directly upon the talking machine cabinet, the exit opening of said cabinet being of substantially the same size as the delivery or exit end of said horn or amplifier, and the vertical sound controlling doors opening independently in a horizontal plane when it is desired to vary the quality of reproduction or to divert the sound to either side of the cabinet.

My present invention is differentiated from the patent aforesaid, and its object is not only to reduce the cost of manufacture of talking machine cabinets of the general character aforesaid, but also to improve their upper front appearance, and, in addition, to provide a novel construction of a door frame, which latter has the tone modulating doors pivotally mounted therein, so as to swing upwardly and downwardly or sidewise or vertically for the purpose of modulating, controlling and varying the sounds reproduced, and, in addition, I provide a novel means for simultaneously effecting the opening and closing or the temporary locking in adjusted position of said tone modulating doors, by means of novel devices common to said doors and frame, which enable both doors to be simultaneously opened, closed or set in adjusted position by the actuation of either door.

My invention further consists of the novel combination of a talking machine horn or amplifier of preferably conical cross-section rigidly secured within the amplifier chamber at both its inlet and discharge ends, with a detachable door frame, which is entirely separate and distinct from the cabinet, said door frame being located in the delivery opening of the cabinet, which is of considerably greater area than the exit end of the concealed horn or amplifier, and has pivotally mounted therein the tone modulating doors, which are adapted to be simultaneously opened and closed or locked in open or closed or intermediate positions by novel means to be hereinafter described.

My invention further consists of the novel combination with the exit end of a talking machine horn of tone modulating doors having coacting connecting mechanism, whereby both of said doors are simultaneously actuated upon the actuation of either door.

By my foregoing invention, I am enabled not only to reduce the cost of manufacture of a talking machine cabinet, but, in addition, by reason of my novel construction of door frame having its borders, as its sides and upper portion, provided with ornamental designs, as scrolls, fret work or woven cane, reed, rattan, or the like, having ornamental configurations, impart to the upper portion of the talking machine cabinet a pleasing and ornamental appearance, which is somewhat lacking when only a pair of rigid doors bridging the entire front of the cabinet are employed.

It further consists of a novel construction of detachable door frame, tone modulating doors carried thereby, and mechanism common to said doors, for enabling said doors to be actuated or set by the actuation of either door, said frame, doors and actuating mechanism being removable as a unit.

To the above ends, my invention consists of a novel construction of a detachable talking machine cabinet, door frame, having tone modulating doors pivoted therein, which are adapted to be simultaneously opened or closed or set in adjusted position by the actuation of either door, and it further consists of a novel collocation of arms, levers and a connecting link common to said tone modulating doors and their door frame for effecting their actuation in unison.

It further consists of other novel features of construction, all as will be hereinafter fully set forth.

For the purpose of illustrating my invention, I have shown in the accompanying drawings a certain form thereof which is at present preferred by me, since the same will give in practice satisfactory and reliable results. It is to be understood, however, that the various instrumentalities of which my invention consists can be variously arranged and organized and that my invention is not limited to the precise arrangement and organization of these instrumentalities as herein shown and described.

Figure 1 represents a vertical sectional view, partly in elevation, of a talking machine containing my novel tone modulating device, comprising an upper detachable door frame, and tone modulating doors and mechanism common to said doors and frame for enabling the latter to be simultaneously actuated upon the actuation of either door, embodying my invention.

Figure 2 represents a front elevation of the upper portion of Figure 1, with my novel door frame, tone modulating doors and their adjuncts removed.

Figure 3 represents on an enlarged scale, a front elevation similar to Figure 2, but showing the door frame, tone modulating doors and their adjuncts in assembled position.

Figure 4 represents a perspective view similar to Figure 3, but showing the tone modulating doors in open position.

Figure 5 represents a section on line 5—5 Figure 3, showing the door actuating mechanism, whereby the actuation of either door actuates the other door.

Figure 6 represents on an enlarged scale, a rear perspective view of the tone modulating device seen in Figures 3, 4 and 5.

Figure 7 represents on a reduced scale a front elevation similar to Figure 3, but showing vertical doors pivoted to the vertical uprights of the door frame, so as to swing laterally or horizontally.

Figure 8 represents on an enlarged scale a rear perspective view of Figure 7.

Similar numerals of reference indicate corresponding parts.

Referring to the drawings:—

In carrying out my invention, I employ a cabinet 1 having a cover 2, which latter is adapted to inclose the upper or sound reproducing chamber 3, wherein are located the turn table 4, the reproducer or sound box 5, and tone arm 6, which parts are supported from the partition 7, below which is located the concealed horn chamber or amplifying chamber 8, wherein I locate the conical horn or sound amplifier 9, whose smaller or inlet end 10 communicates with the reproducing devices and is secured in fixed position by any convenient means, as is also its larger or exit end 12, the latter having its lower end if desired supported upon or secured to the partition 13, which forms the bottom of said amplifier chamber 8.

The turn table 4 is actuated by a motor 14 having a motor spindle for actuating said turn table, said motor having governing and stop mechanism (not shown) of the usual construction, and as the matter of assembling and operating the foregoing elements will be apparent to those skilled in the art, the same require no further description. The discharge or exit end 12 of the concealed horn or amplifier is of considerably less area than the front exit opening 15 of the cabinet 1, which extends across the entire front of the latter (as will be apparent from Figure 2), and in order to close said opening 15 and to give pleasing and ornamental appearance to the upper portion of the cabinet, I employ a door frame 16, comprising the top and bottom strips or members 17 and 18, which are joined by the outer vertical strips or members 19 and 20.

21 and 22 designate inner vertical strips or uprights, which serve additionally to support the upper intermediate horizontal member 23 of the door frame, which is secured to said uprights. The strip 23 has the upper tone modulating door 24 pivotally secured or hinged thereto at its top edge at the points 45, the lower tone modulating door 25 being pivotally secured or hinged at its bottom at the points 46 to the lower horizontal member 18 of said door frame, the hinges 44 and 45 being preferably secured in position so as to be invisible from the front of the cabinet. The door frame 16 is assembled in position in the front of the cabinet so as completely to fill or close the opening 15, by first inserting the top portion as 17, into the recess 26 seen at the upper right-hand portion of Figure 1, and next pushing the frame upwardly a short distance, after which the bottom of the frame is moved inwardly so that the frame stands substantially vertical, and it is then allowed to drop into the lower seat 27, which latter receives the bottom 18 of said frame, as will be understood from Figure 1.

I preferably design the door frame 16 so that the distance between the horizontal strips 23 and 18 when said frame is in position, is about the same distance as the diameter of the exit end 12 of the horn 9, as will be understood from Figures 1, 3 and 4, so that said exit end of said horn will be properly and effectively controlled by the manipulation of the tone modulating doors 24 and 25.

It is desirable in devices of this character to enable the tone modulating doors 24 and 25 mounted in the detachable door frame 16 to be actuated simultaneously, or, in other words, to provide mechanism whereby a pull outwardly upon the knob 28 or 29 of either of said doors will simultaneously actuate or set the other door, and, in addition, will enable or cause both doors when open or partly open, to occupy substantially the same relative position to the axis of the exit end of the horn, which I accomplish by means of any suitable mechanism, one form of which is seen in Figures 1 and 3, wherein 30 designates an arm pivotally attached at one end to the lower portion of the lower door 25, the opposite end of said arm being pivotally connected at 31 to the vertical arm 32 of the bell crank or elbow lever 33, which is fulcrumed on the end of a stud or bracket 34, which latter is secured to any desired point, as the upright 19 (see Figure 6), said bell crank lever having the horizontal arm 35, to which is pivotally secured the lower end of the link 36. The upper end of the link 36 is pivotally secured to the horizontal arm 37 of the upper bell crank lever 38, which is fulcrumed upon the end of the stud or bracket 39, which is secured to any desired point, as the back of the upright 19 (see Figure 6), said bell crank lever 38 having the depending arm 40, which is pivoted to one end of the arm 41, whose opposite end is pivotally secured to the upper portion of the upper tone modulating door 24, the general arrangement and collocation of the parts being apparent from Figures 1, 5 and 6, from which it will be seen that a pull upon the knob 28 or 29 of either door will simultaneously actuate both doors in unison, so that the same will remain in open, closed or partly open or closed position, the desired adjustment of the doors being effected simultaneously for the purpose of modulating the tones or sounds issuing from the exit end of the horn.

It will be apparent that two of the connecting mechanisms seen at the left of Figure 6 may be employed, if desired, but in practice, one will suffice, and by my novel construction, the door frame, its doors and their connecting mechanism can be removed or replaced as a unit.

It will be apparent that the door frame 16, as seen particularly in Figures 3, 4, 6, 7 and 8, has the upper horizontal space 47 and the vertical side spaces 42, which can be filled with scroll or fret work, having silk or other suitable fabric in the back thereof. The tone modulating doors 43 and 44 as seen in Figures 7 and 8, may stand vertically and open horizontally and may be composed of closely woven material, while the doors 24 and 25, seen in Figures 4 and 5, may also be composed of cane, reed, rattan or the like, closely woven and stained or colored to conform to the prevailing color of the cabinet.

While I have shown only the tone modulating doors seen in Figures 1, 3, 6, 7 and 8 as being of closely woven material, it will be apparent that the doors seen in Figures 4 and 5 may be so constructed without departing from the spirit of my invention.

The fulcrums 39 and 34 of the elbow levers 38 and 33 are preferably supported from one of the door frame uprights, as 19, or in any other desired manner, and it will be apparent that within the broad principle of my invention, various types of connecting devices common to the tone modulating doors and their door frame may be employed to effect the simultaneous opening and closing thereof or their adjustment in unison, according to requirements.

In the construction seen in Figures 1, 3, 6, 7 and 8, where the doors or woven material are shown, I preferably employ outer door frames as 48, which may be rectangular for cheapness of construction, the space between said frames being bridged by the woven material aforesaid.

In the construction seen in Figures 7 and 8, the doors swing sidewise or horizontally and are equipped with the connecting mechanism comprising the parts 30, 33, 36, 38 and 41, best seen in Figure 8, but I have only shown the link 36 in said Figure 7 for clearness of illustration, said link in Figures 7 and 8 standing horizontally instead of vertically, as seen in Figures 1, 3 and 5.

The various pivotal connections best seen in Figures 5, 6 and 8 are made sufficiently tight so that by their frictional contact alone, the doors 24 and 25 will remain set in their adjusted open positions, as seen in Figures 1 and 4, and the elbow levers 38 and 33 may